US011838265B1

(12) United States Patent
Parmar et al.

(10) Patent No.: US 11,838,265 B1
(45) Date of Patent: Dec. 5, 2023

(54) MANAGING ADDRESS COLLISION IN A NETWORK DEVICE

(71) Applicant: Marvell Asia Pte Ltd, Singapore (SG)

(72) Inventors: Harivaden Parmar, Wokingham (GB); Gleb Ovchinnikov, Munich (DE); Jessica Lauren Mann, Sanibel, FL (US)

(73) Assignee: MARVELL ASIA PTE LTD, Singapore (SG)

( * ) Notice: Subject to any disclaimer, the term of this patent is extended or adjusted under 35 U.S.C. 154(b) by 0 days.

(21) Appl. No.: 17/841,703

(22) Filed: Jun. 16, 2022

Related U.S. Application Data (60) Provisional application No. 63/212,484, filed on Jun. 18, 2021.

(51) Int. Cl.
| | |
|---|---|
| *G06F 12/1018* | (2016.01) |
| *G06F 12/0864* | (2016.01) |
| *H04L 61/5046* | (2022.01) |
| *H04L 9/06* | (2006.01) |
| *H04L 9/40* | (2022.01) |
| *H04L 61/5007* | (2022.01) |

(52) U.S. Cl.
CPC ........ *H04L 61/5046* (2022.05); *H04L 9/0643* (2013.01); *H04L 9/40* (2022.05); *H04L 61/5007* (2022.05)

(58) Field of Classification Search
CPC ... H04L 61/5046; H04L 61/5007; H04L 9/40; H04L 9/0643
See application file for complete search history.

(56) References Cited

U.S. PATENT DOCUMENTS

| | | | | |
|---|---|---|---|---|
| 9,436,558 | B1* | 9/2016 | Per | G06F 16/113 |
| 9,537,771 | B2* | 1/2017 | Arad | G06F 16/245 |
| 10,348,603 | B1* | 7/2019 | Singh | H04L 45/7453 |
| 10,706,101 | B2* | 7/2020 | Breslow | G06F 16/9014 |
| 11,080,204 | B2* | 8/2021 | Teotia | G06F 16/2453 |
| 2004/0193875 | A1* | 9/2004 | Aura | H04L 63/123 |
| | | | | 713/162 |

(Continued)

OTHER PUBLICATIONS

OPEN Alliance, "Requirements for Ethernet Switch Semiconductors", version 1.0, pp. 1-16, Sep. 28, 2016.

(Continued)

*Primary Examiner* — Christopher B Robinson (57) ABSTRACT

A network device includes a memory, a memory access circuit, and a processor. The memory is configured to store a hash table for accessing a database of network addresses, the hash table including multiple buckets, each bucket dimensioned to store entries for up to a maximal permitted number of the network addresses. The memory access circuit is configured to receive a network address, to calculate a hash value over at least the network address by applying a hashing scheme selected from among a plurality of hashing schemes, to choose a bucket of the hash table based on the hash value, and to access information in the database pertaining to the network address by accessing the selected bucket. The processor is configured to select the hashing scheme to ensure that none of the buckets will be mapped to more than the maximal permitted number of the network addresses.

18 Claims, 4 Drawing Sheets

(56) References Cited

U.S. PATENT DOCUMENTS

2009/0006607 A1* 1/2009 Bu ................... H04L 63/1408
709/224
2020/0287830 A1* 9/2020 Capper ............. H04L 67/1001

OTHER PUBLICATIONS

IEEE Std. 802.3ch-2020, "IEEE Standard for Ethernet, Amendment 8: Physical Layer Specifications and Management Parameters for 2.5 Gb/s, 5 Gb/s, and 10 Gb/s Automotive Electrical Ethernet", pp. 1-207, year 2020.

IEEE Std. 802.3bp-2016, "IEEE Standard for Ethernet, Amendment 4: Physical Layer Specifications and Management Parameters for 1 Gb/s Operation over a Single Twisted-Pair Copper Cable", pp. 1-211, year 2016.

IEEE Std. 802.3bw-2015, "IEEE Standard for Ethernet, Amendment 1: Physical Layer Specifications and Management Parameters for 100 Mb/s Operation over a Single Balanced Twisted Pair Cable (100BASE-T1)", pp. 1-88, year 2015.

IEEE Std. 802.3cg-2019, "IEEE Standard for Ethernet, Amendment 5: Physical Layers Specifications and Management Parameters for 10 Mb/s Operation and Associated Power Delivery over a Single Balanced Pair of Conductors", pp. 1-265, year 2019.

IEEE Std. 802.1Q-2005, "IEEE Standard for Local and Metropolitan Area Networks—Virtual Bridged Local Area Networks", pp. 1-303, year 2005.

OPEN Alliance, "Switch Semiconductor Test Specification", version V1.ORC2, draft, pp. 1-187, Oct. 1, 2018.

\* cited by examiner

FIG. 4

MANAGING ADDRESS COLLISION IN A NETWORK DEVICE

CROSS-REFERENCE TO RELATED APPLICATIONS

This application claims the benefit of U.S. Provisional Patent Application 63/212,484, filed Jun. 18, 2021, whose disclosure is incorporated herein by reference.

FIELD OF THE DISCLOSURE

The present disclosure relates generally to network communication, and particularly to methods and systems for managing address collisions in a communication.

BACKGROUND

In some communication networks, e.g., automotive networks, requirements are specified for assignment and handling of network addresses. For example, a One-Pair Ethernet (OPEN) Alliance specification entitled "Requirements for Ethernet Switch Semiconductors," version 1.0, Sep. 28, 2016, specifies requirements for Automotive Ethernet Switch Semiconductors. Section 3.2 of this specification defines requirements concerning address resolution logic inside Ethernet Switches, including requirements relating to address conflicts.

The description above is presented as a general overview of related art in this field and should not be construed as an admission that any of the information it contains constitutes prior art against the present patent application.

SUMMARY

An embodiment that is described herein provides a network device including a memory, a memory access circuit, and a processor. The memory is configured to store a hash table for accessing a database of network addresses, the hash table including multiple buckets, each bucket dimensioned to store entries for up to a maximal permitted number of the network addresses. The memory access circuit is configured to receive a network address, to calculate a hash value over at least the network address by applying a hashing scheme selected from among a plurality of hashing schemes, to choose a bucket of the hash table based on the hash value, and to access information in the database pertaining to the network address by accessing the selected bucket. The processor is configured to select the hashing scheme from among the plurality of the hashing schemes so as to ensure that none of the buckets will be mapped to more than the maximal permitted number of the network addresses.

In some embodiments, the memory access circuit is configured to apply the hashing scheme by calculating a hash function over at least the network address, so as to produce a hash result, and deriving the hash value by selecting a partial subset of bits of the hash result, the partial subset defined by the selected hashing scheme and including less than all bits of the hash result.

In some embodiments, the processor is configured to monitor fill levels of one or more of the buckets, and to modify selection of the hashing scheme in response to the fill levels violating a condition defined with respect to the maximal number of the network addresses. In an example embodiment, the network device is part of a communication network in a vehicle, and the processor is configured to monitor the fill levels of the buckets in response to an event indicative of a change in assignment of the network addresses in the communication network.

In an embodiment, the processor is configured to monitor the fill levels periodically. Additionally or alternatively, the processor is configured to receive from the memory access circuit a notification that one or more of the buckets violates the condition, and to modify selection of the hashing scheme in response to the notification.

In an example embodiment, the processor is configured to modify selection of the hashing scheme by backing-up the hash table, which was populated in accordance with a first hashing scheme, to a backup memory, re-populating the hash table in accordance with a second hashing scheme, different from the first hashing scheme, and ascertaining that none of the buckets of the re-populated hash table is mapped to more than the maximal permitted number of the network addresses.

In another embodiment, the processor is configured to issue a failure notification upon failing to find any hashing scheme for which no bucket is mapped to more than the maximal permitted number of the network addresses. In an embodiment, the network addresses are Medium Access Control (MAC) addresses.

There is additionally provided, in accordance with an embodiment that is described herein, a method for database access in a network device. The method includes storing, in a memory, a hash table for accessing a database of network addresses, the hash table including multiple buckets, each bucket dimensioned to store entries for up to a maximal permitted number of the network addresses. In a memory access circuit, a network address is received, a hash value is calculated over at least the network address by applying a hashing scheme selected from among a plurality of hashing schemes, a bucket of the hash table is chosen based on the hash value, and information in the database, pertaining to the network address, is accessed by accessing the selected bucket. The hashing scheme is selected from among the plurality of the hashing schemes, using a processor, so as to ensure that none of the buckets will be mapped to more than the maximal permitted number of the network addresses.

The present disclosure will be more fully understood from the following detailed description of the embodiments thereof, taken together with the drawings in which:

DETAILED DESCRIPTION OF EMBODIMENTS

Network elements in a communication network may maintain and use databases of network addresses and associated information. For example, a Layer-2 switch may maintain a database of Medium Access Control (MAC)

addresses of various network endpoints. Such a database may specify for each MAC address, for example, the identity of the port via which traffic should be forwarded to that MAC address, as well as various policies relating to the MAC address. Example policies may relate, for example, to management, Quality-of-Service (QoS), priorities, handling of audio or video data, ingress rate limiting, or any other suitable policy.

In order to enable fast and efficient database access, the network element may use a hash table divided into multiple buckets. Each bucket is dimensioned to store database entries for up to a predefined number of MAC addresses. In an example implementation, each bucket comprises a predefined number of bins, wherein a given bin can be empty or can store a database entry for a single MAC address. To access the database with a certain MAC address, the network element calculates a hash value over the MAC address (possibly in combination with additional information) in accordance with a certain hashing scheme. The hash value is mapped to a respective bucket in the hash table. The database entry associated with the MAC address can be stored in any of the bins of that bucket.

When using the above-described hashing mechanism, the maximal number of populated bins in any bucket is limited to a number denoted B. In one non-limiting example, the hash table is divided into 256 buckets, with each bucket dimensioned to store up to four entries (i.e., B=4). In order for the database to function correctly, the overall constellation of MAC addresses in the network should map onto the hash table without requiring more than the maximal permitted number of bins per bucket. In other words, a hash table that supports up to B bins per bucket cannot be used if the network has more than B MAC addresses that are hashed onto the same bucket. Such an event is referred to herein as "address collision", "address conflict" or "overflow".

In some practical use-cases it is important to identify and mitigate actual or imminent address collisions. Consider, for example, a network that connects multiple endpoints in a vehicle, e.g., sensors, Electronic Control Units (ECUs) and/or components of ECUs. In such a network, there is no guarantee that the constellation of MAC addresses in a given vehicle will be free of address collisions. Even if the vehicle vendor were able to assign MAC addresses that meet this condition upon production of the vehicle, address collisions may still occur later in the vehicle's lifecycle, e.g., following component replacement or upon connection of external equipment (e.g., a diagnostic computer) to the network.

Embodiments that are described herein provide methods and systems for managing and avoiding address collisions in databases of network elements. The disclosed techniques are described mainly in the context of MAC addresses in an in-vehicle Ethernet network. These embodiments, however, are non-limiting examples that have been chosen purely for the sake of clarity. The disclosed techniques are applicable in various other types of network types, network addresses and use-cases.

In some embodiments described herein, the network element comprises a processor that, possibly among other tasks, identifies and mitigates address collisions. Recall that, as described above, a MAC address is mapped to a bucket by hashing the MAC address and then deriving the bucket index from the resulting hash value. As such, selecting a different hashing scheme would change the distribution of MAC addresses across the buckets. It follows that, if address collision occurs when using a certain hashing scheme, then selecting a different hashing scheme may eliminate the collision.

In some embodiments, the processor of the network element is configured to store a set of multiple different hashing schemes. The processor monitors the fill levels of the various buckets of the hash table, e.g., periodically or in response to relevant events. If a given bucket is found to meet a "bucket full" condition, e.g., exceed or approach the maximal permitted number of populated bins, the processor reverts to a different hashing scheme from the set. In an example embodiment, the processor backs-up the database to a backup memory, and then re-populates the buckets using a mapping that uses a different hashing scheme.

If none of the hashing schemes results in a collision-free hash table, the processor may issue an alert indicating that address collision is irrecoverable. An irrecoverable address collision can be rectified, for example, by changing one or more of the MAC addresses in the network, e.g., by replacing one or more endpoints.

In various embodiments, the above-described process may be performed periodically, upon initial deployment of the network during production of the vehicle, on any start-up of the vehicle, and/or following replacement of an endpoint such as an ECU.

In various embodiments, the disclosed techniques can be used with various sets of hashing schemes. In some embodiments, the various hashing schemes in the set use the same hashing function, which produces a hash result. Different hashing schemes, however, select different partial subsets of bits of the hash result. The selected partial subset of bits is used as a hash value that is mapped to a bucket index. The non-selected bits of the hash result typically are discarded and have no influence on bucket selection. Different hashing schemes may select, for example, the lower-significance half of the hash result, the higher-significance half of the hash result, a subset of bits scattered throughout the hash result, or other suitable partial subset of bits. In alternative embodiments, different hashing schemes in the set may use different hashing functions.

The description that follows refers mainly to hashing schemes that correspond to respective different partial subsets of bits of the hash result of the same hashing function. This choice, however, is made solely by way of example. The disclosed techniques can be carried out using any other suitable set of different hashing schemes.

The disclosed techniques enable the use of bucketized hash tables, which are highly efficient in terms of memory usage, logic size and access time. At the same time, the disclosed techniques guarantee network device operation that is free of address collisions, without imposing constraints on a-priori assignment of network addresses.

Figure 1:
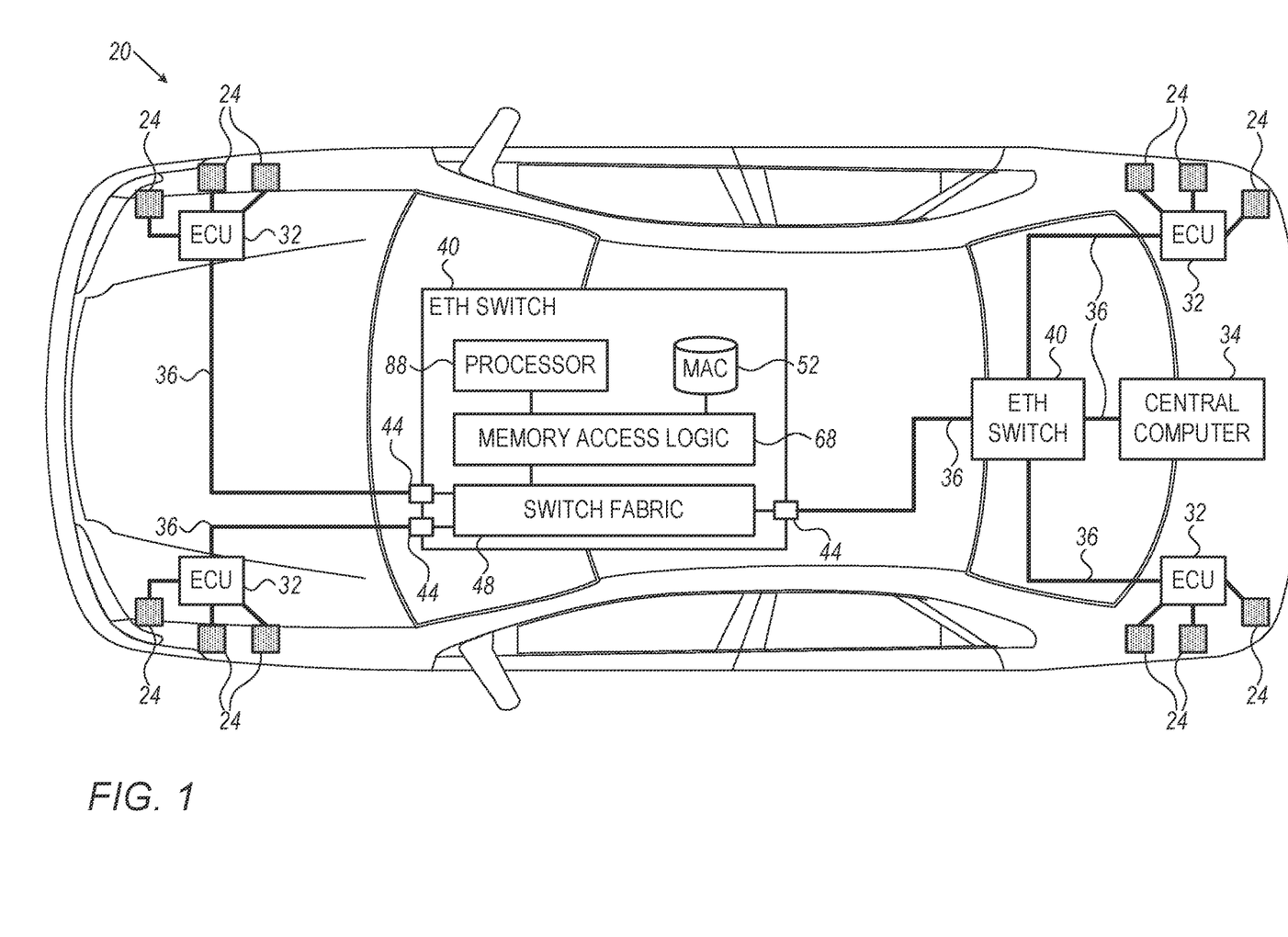
FIG. 1 is a block diagram that schematically illustrates an automotive computing and communication system, in accordance with an embodiment that is described herein.

FIG. 1 is a block diagram that schematically illustrates an automotive computing and communication system 20, in accordance with an embodiment that is described herein. System 20 is installed in a vehicle, and comprises various sensors 24, multiple Electronics Control Units (ECUs) 32, and a central computer 34. It is noted that although the embodiments described herein refer mainly to automotive networks, the disclosed techniques can be used in network elements of other suitable networks, for example industrial and smart-home networks.

Sensors 24 may comprise, for example, video cameras, velocity sensors, accelerometers, audio sensors, infra-red sensors, radar sensors, lidar sensors, ultrasonic sensors, rangefinders or other proximity sensors, or any other suitable sensor type. In the present example, each ECU 32 (sometimes referred to as a "zone ECU") is connected to the sensors installed in a respective zone of the vehicle. Each ECU 32 typically controls its respective sensors 24 and collects data from the sensors.

In some embodiments, the various components of system 20 are deployed at various different locations in the vehicle and communicate over a packet network installed in the vehicle. In the present example the packet network comprises an Ethernet network, but other suitable network protocols can also be used. The network comprises multiple Ethernet links 36, and one or more Ethernet switches 40. In various embodiments, the bit rate used in the network may be 10 G bits per second (10 Gbps) in accordance with IEEE 802.3ch, 1000 Mbps in accordance with IEEE 802.3 bp, 100 Mbps in accordance with IEEE 802.3bw, 10 Mbps in accordance with IEEE 802.3cg(10Base-T1s), or any other suitable bit rate. Links 36 may comprise, for example, twisted-pair copper links or any other type of link suitable for Ethernet communication.

Figure 2:
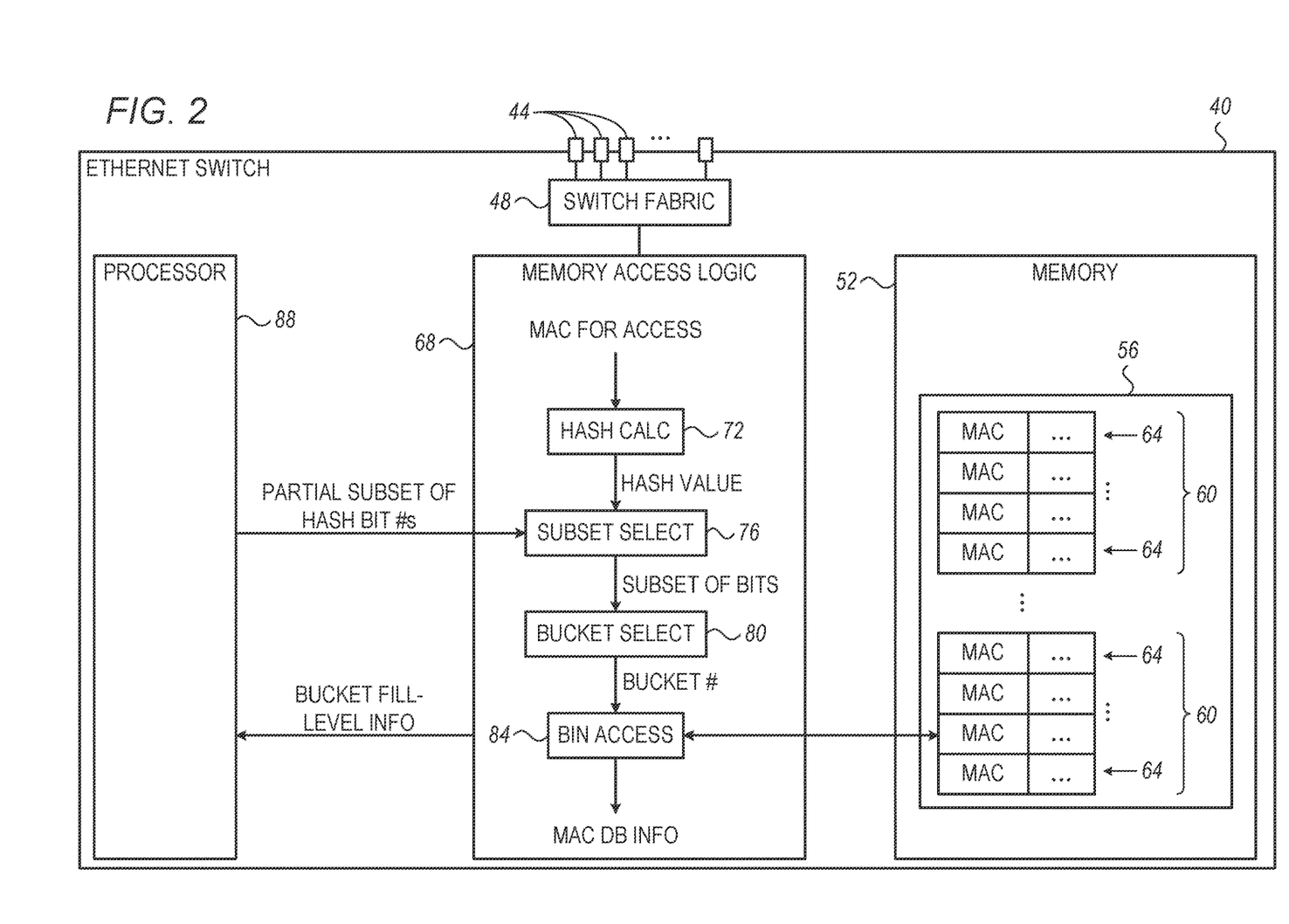
FIG. 2 is a block diagram that schematically illustrates a switch in the system of FIG. 1, in accordance with an embodiment that is described herein.

In the present non-limiting example, system 20 comprises two switches 40. The internal structure of one of switches 40 is shown in some detail in FIG. 1, and greater detail is shown in FIG. 2 below. Each switch 40 comprises multiple ports 44 for connecting to respective links 36, and a switch fabric 48 for forwarding packets between ports 44. In the present example, switch 40 is a Layer-2 switch that forwards packets in accordance with MAC addresses specified in the packets. Each packet comprises a Source MAC Address (SA) that specifies the network endpoint from which the packet originates, and a Destination MAC Address (DA) that specifies the network endpoint to which the packet is destined.

In the present context, the term "network endpoint" (or simply "endpoint") refers to any component of system 20 that is assigned a MAC address and can therefore serve as a source and/or destination of Ethernet packets. Examples of endpoints comprise sensors 24, ECUs 32 and central computer 34. In some embodiments, one or more endpoints may be located outside the vehicle, e.g., in a diagnostic computer that is connected to the vehicle temporarily.

Switch 40 further comprises a memory 52 that stores a database of MAC addresses, and memory access logic 68 (also referred to as a memory access circuit) configured to access the database stored in memory 52. Memory access logic 68 is also referred to as an Address Translation Unit (ATU). In the present context, the term "accessing the database" refers both to storing information in the database in association with a MAC address, and to looking-up information in the database in association with a MAC address. Logic 68 typically is invoked by a query or a store command from switch fabric 48.

Switch 40 additionally comprises a processor 88 that, possibly among other tasks, identifies and mitigates address collisions in the database, using techniques that are described in detail below.

FIG. 2 is a block diagram that schematically illustrates an internal structure of switch 40, in accordance with an embodiment that is described herein. In the embodiment of FIG. 2, the MAC-address database is structured as a hash table 56 divided into multiple buckets 60. Each bucket is divided into a predefined number of bins 64. A given bin 64 can be empty, or it can store a database entry corresponding to a respective MAC address.

A given database entry can hold any suitable information relating to the corresponding MAC address, for example a Destination Port Vector, one or more policies defined for the MAC address (e.g., policies relating to Audio/Video data, or a management policy), a Quality of Service (QoS) priority used (e.g., selected from among eight QoS levels as per IEEE 802.1Q), whether the MAC address is subject to ingress rate limiting, etc.), VLAN tag priority, egress queue, instructions to override the frame type and regard it, for example, as an AVB frame, i.e., a frame that is a stream of audio or video data, information relating to expiration of the entry, etc.

In some embodiments, e.g., when the amount of information per MAC address is relatively small, the information itself is stored in the database entries of the hash table. In other embodiments, e.g., when the information size is relatively large, the database entries in the hash table hold pointers that point to the location of the information physically stored in the memory. Both configurations, as well as hybrid solutions that combines them, are regarded herein as "storing information in the database".

In the present non-limiting example, the number of buckets is 256, the number of bins per bucket (the maximal number of entries that may be populated per bucket) is four, and the maximal number of MAC addresses in the network is 1024. In alternative embodiments, any other suitable values can be used.

In an embodiment, memory access logic 68 comprises a hash calculator 72, a subset selector 76, a bucket selector 80 and a bin access circuit 84. Typically, although not necessarily, these components are implemented in hardware to achieve high speed and throughput in accessing the database.

To access the database with a certain MAC address, hash calculator 72 first calculates a predefined hash function over the MAC address, so as to produce a hash value. In the present example the hash function is a Cyclic Redundancy Check (CRC). The resulting hash value is a 16-bit value. Alternatively, any other suitable hash function can be used.

Having produced a hash value by hash calculator 72, subset selector 76 selects a predefined partial subset of the bits of the hash value. Using only a partial subset of the bits of the hash value reduces the size of the database and therefore the cost of the device. As will be elaborated below, the partial subset of bits is specified by processor 88 in a process that attempts to avoid address collisions.

In the present embodiment, processor 88 may choose between the following partial subsets of bits:

TABLE 1

Example subsets of hash value bits

| Mode | Selected subset of hash value bits |
| --- | --- |
| Scattered | Bit positions scattered throughout hash value |
| Lower | Bit positions chosen from lower part of hash value |
| Upper | Bit positions chosen from upper part of hash value |

For a given subset (a given row of Table 1), a respective subset of eight bit values are extracted from specified positions in the 16-bit hash value. The resulting eight bit word is indicative of a respective bucket. The number of subsets in the table, and the selected bit positions in each subset, are given above purely by way of example. In alternative embodiments, processor 88 and subset selector 76 may use any other suitable partial subsets. For example, memory permitting, the partial subsets may comprise a larger number of bits, e.g., eleven bits, thereby increasing the number of buckets.

In an embodiment, processor 88 receives from logic 68 information regarding the fill levels of buckets 60. Processor 88 uses this information to decide whether address collision is occurring or imminent, and/or to choose between different partial subsets of bits of the hash value (e.g., between different modes in Table 1 above).

Having selected a partial subset of bits of the hash value by subset selector 76, bucket selector 80 selects a bucket 60 in hash table 56 based on the partial subset of bits. Bin access circuit 84 finds, in the selected bucket, a bin that corresponds to the desired MAC address. Bin access circuit 84 then accesses the information associated with the MAC address in the bin.

For example, to look-up information associated with a MAC address, circuit 84 finds, in the selected bucket 60, a bin 64 that contains an entry associated with the MAC address. Circuit 84 then reads the associated information and returns it to the requester, e.g., to switch fabric 48. If no such bin is found, circuit 84 returns an error message.

To store information in association with a MAC address, circuit 84 first finds whether one of the bins in the bucket already contains an entry associated with the MAC address. If so, circuit 84 updates the existing entry with the new information. If not, circuit 84 selects an empty bin in the bucket and creates a new entry with the MAC address and the new information. If the bucket does not contain an existing entry for the MAC address, and does not have an empty bin for creating one, this situation is regarded as an address collision. When functioning properly, address collision is not permitted to occur—As explained below.

Figure 3:
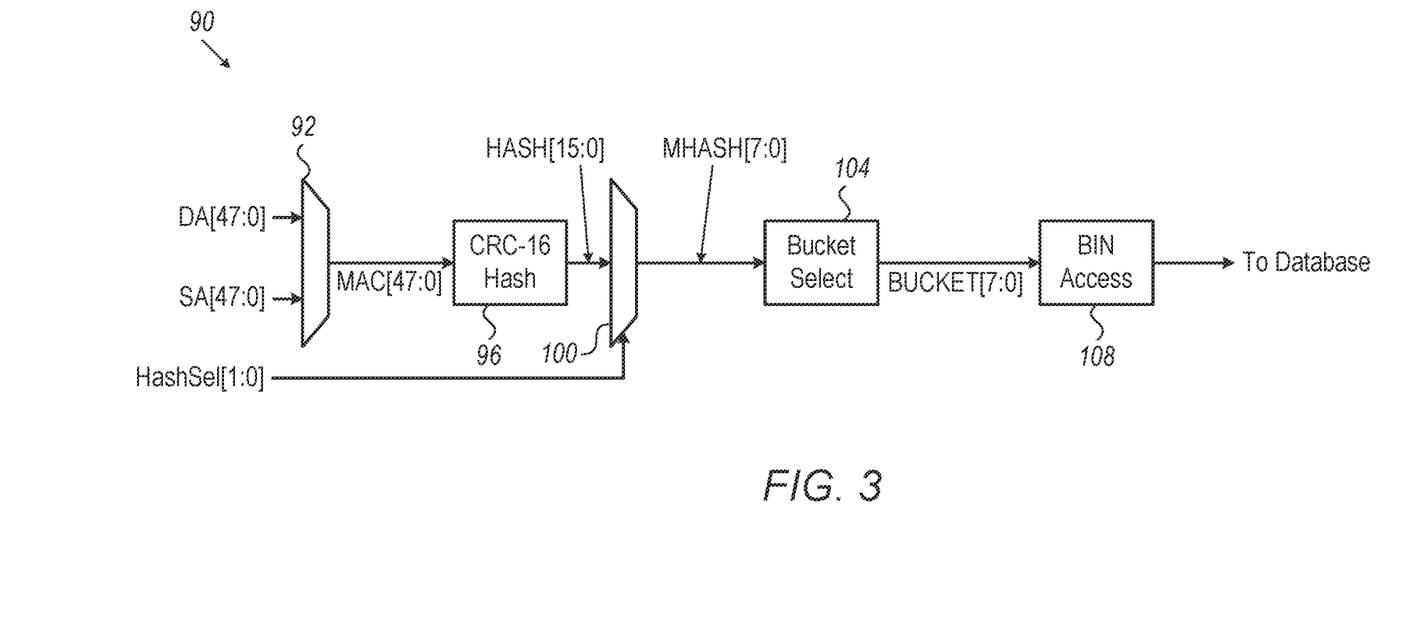
FIG. 3 is a block diagram that schematically illustrates memory access logic for use in the system of FIG. 1, in accordance with an embodiment that is described herein.

FIG. 3 is a block diagram that schematically illustrates memory access logic 90, in accordance with an embodiment that is described herein. Logic 90 can be used for implementing memory access logic 68 in Ethernet switch 40 of FIG. 2 above.

In the present example, logic 90 receives the following as input for a given database access operation:

A 48-bit MAC address to be accessed (stored or looked-up). The MAC address may be a destination address (DA) or a source address (SA).

A two-bit value (denoted HashSel) specifying the index of the partial subset of hash-value bits to be selected.

A switch 92 selects between the DA and SA inputs as appropriate. The input MAC address is provided to a CRC-16 hash calculator 96, which derives a 16-bit hash value from the MAC address. A subset selector 100 extracts a specified subset of eight bits from the 16-bit hash value, depending on the HashSel input. The resulting 8-bit value is denoted MHASH.

A bucket selector 104 derives a bucket index from MHASH, possibly in combination with additional information. In an example embodiment, bucket selector 104 calculates the bucket index depending on (i) MHASH and (ii) an identifier of a Forwarding Information Database (FID) to be used in the database access. A bin access circuit 108 accesses the four bins in the specified bucket and reads the MAC addresses from the accessed bins.

The configuration of system 20 and its components, such the internal structure of switch 40, and the configurations of logic 68 and logic 90, as shown in FIGS. 1-3, are example configurations that are depicted solely for the sake of clarity. In alternative embodiments, any other suitable configurations can be used.

The different components of system 20 may be implemented using dedicated hardware or firmware, such as using hard-wired or programmable logic, e.g., in an Application-Specific Integrated Circuit (ASIC) or Field-Programmable Gate Array (FPGA). Additionally or alternatively, the functions of any component of system 20 may be implemented in software and/or using a combination of hardware and software elements. Elements that are not mandatory for understanding of the disclosed techniques have been omitted from the figure for the sake of clarity.

In some embodiments, some functions of the components of system 20, e.g., of processor 88, of logic 68 and/or of logic 90, may be implemented in one or more programmable processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Figure 4:
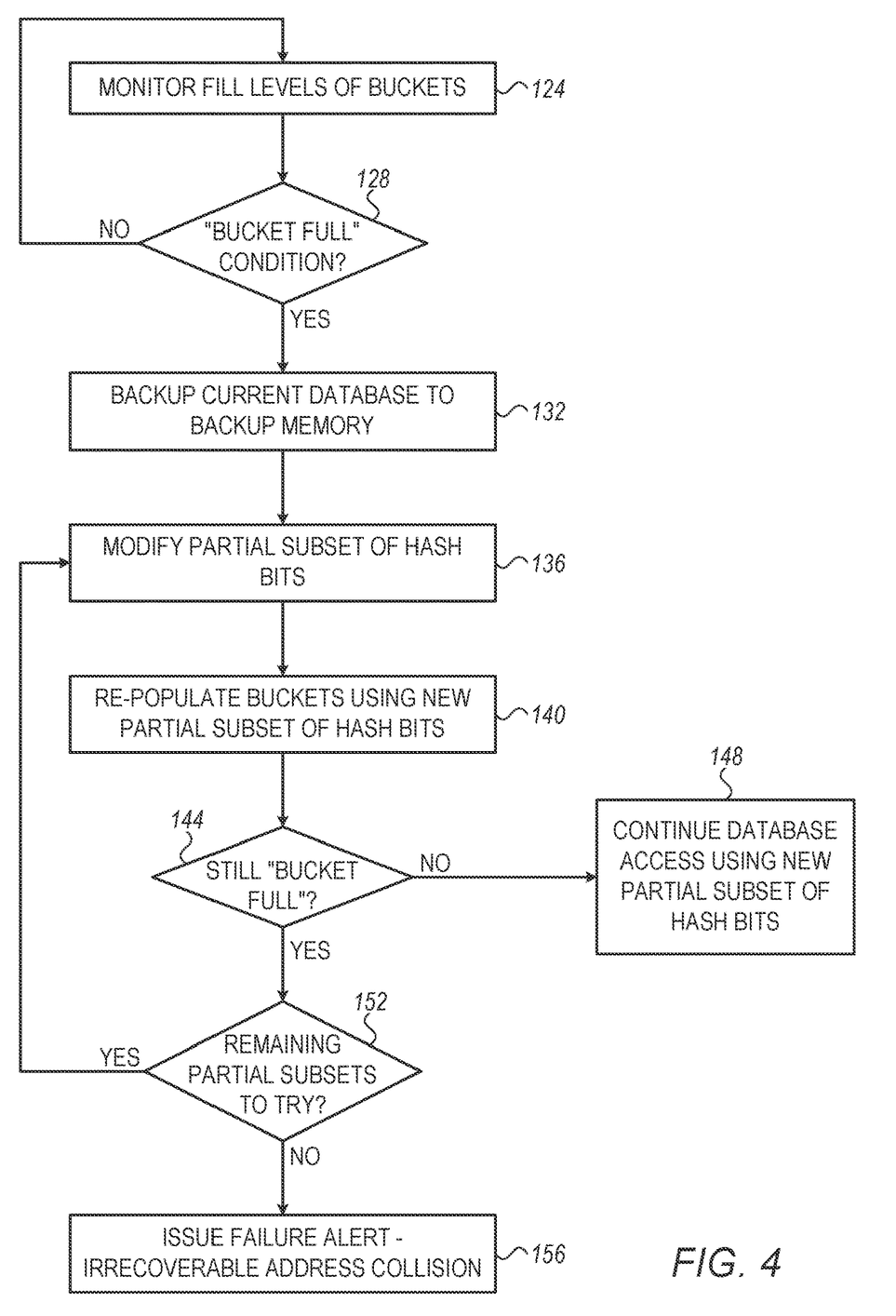
FIG. 4 is a flow chart that schematically illustrates a method for managing address collisions in the system of FIG. 1, in accordance with an embodiment that is described herein.

FIG. 4 is a flow chart that schematically illustrates a method for managing address collisions in system 20 of FIG. 1, in accordance with an embodiment that is described herein. The method begins with processor 88 monitoring the fill levels of one or more of buckets 60, at a bucket monitoring stage 124. In some embodiments, processor 88 monitors the fill levels by obtaining fill-level information from memory access logic 68.

For example, in one embodiment the fill-level information consists of a single bit that specifies whether any of buckets 60 is fully populated with database entries (e.g., "0" indicating that none of the buckets are full, and "1" indicating that at least one bucket is full). Alternatively, any other suitable fill-level information can be used. Memory access logic 68 may provide the fill-level information in response to a request from processor 88, or independently of any request, e.g., in response to a bucket becoming full.

In an example embodiment, processor 88 monitors the bucket fill levels every 100 ms during operation of system 20 in the vehicle. Alternatively, any other suitable interval can be used. Additionally or alternatively, processor 88 may monitor the bucket fill levels in response to an event that may be correlative with a change in assignment of MAC addresses in the network. Such an event may be, for example, start-up of the vehicle or replacement of an endpoint (e.g., sensor or ECU).

In an embodiment, processor 88 may be programmed to stop the monitoring after a predefined timeout. The time-out is typically selected to be long enough, so that no new devices are likely to connect to the network. This measure could be taken to prevent reshuffling of the MAC address table during normal operation (e.g., while the vehicle is moving).

At a condition checking stage 128, processor 88 checks whether a "bucket full" condition is met. In one embodiment, the "bucket full" condition is met if at least one bucket 60 in hash table 56 is fully populated with MAC addresses. In such a case, mapping any additional MAC address to a full bucket will cause address collision. An address collision would result in the oldest MAC address entry to be deleted from the database, triggering flooding of related Ethernet traffic on multiple ports, potentially disrupting operation of the network. Alternatively, other suitable conditions can be defined. If the "bucket full" condition is not met, the method loops back to stage 124 above.

Upon meeting the "bucket full" condition at stage 128, processor 88 initiates a process that aims to avoid the imminent address collision. At a backup stage 132, processor 88 backs-up the current database structure (e.g., the current hash table 56) to a backup memory (not seen in the figures). The backup memory may comprise, for example, an internal Random Access Memory (RAM) of processor 88.

At a subset modification stage 136, processor 88 switches to use (i.e., to derive bucket indices from) a different partial subset of bits of the hash values. At a re-population stage 140, processor 88 initializes hash table 56, and then re-populates the hash table in accordance with the newly-selected partial subset of bits.

For example, if the "bucket full" condition was met while using the lower-significance bits of the hash values, processor 88 may switch to use (i.e., derive the bucket indices from) the higher-significance bits of the hash values, or the scattered bits of the hash values, as defined in table 1 above.

At a re-checking stage 144, processor 88 checks whether the "bucket full" condition is still met. If not, i.e., processor 88 and logic 68 continue operation using the newly-selected partial subset of bits, and the method terminates, at a success termination stage 148. In an example embodiment, before declaring normal operation using the new subset, processor 88 monitors the bucket fill levels for an additional time period, e.g., five seconds. If no new "bucket full" condition emerges, normal operation resumes.

If the "bucket full" condition is still met after changing the partial subset of bits, processor 88 proceeds to check whether there are any additional partial subsets of bits that have not been evaluated yet, at a remaining subset checking stage 152. If so, the method loops back to stage 136 to evaluate a new partial subset. If there are no remaining partial subsets to try, and the "bucket full" condition is still in effect, processor 88 issues an alert, at an alerting stage 156. The alert indicates that the imminent address collision is irrecoverable.

The alert may be issued to any higher-level entity, e.g., to a System-on-Chip (SoC) that manages switch 40. Any suitable alert format can be used, e.g., an Ethernet packet having a predefined simple format. In this embodiment, the SoC may pass the alert to a factory tester or other system outside the vehicle.

The method flow of FIG. 4 is an example flow that is depicted purely for the sake of conceptual clarity. In alternative embodiments, the disclosed techniques can be carried out using any other suitable flow. For example, in some embodiments, upon finding (at stage 144) a certain partial subset of hash bits that mitigates the "bucket full" condition, processor 88 may save the new subset (e.g., the new HashSel value of FIG. 3) in non-volatile memory (e.g., Flash memory) to avoid repeating the trial-and-error process on every start-up. The subset may be saved in Flash using some simple hash protection or error detection coding. On subsequent start-up of the vehicle, processor 88 loads the saved configuration (e.g., HashSel value) from the non-volatile memory and use it as an initial configuration.

Although the embodiments described herein refer mainly to automotive networks, the methods and systems described herein can also be used in other applications, such as in other engineered networks (i.e., networks in which the set of endpoints is static and known in advance), or networks that rarely change. Examples of networks that rarely change may comprise manufacturing machine control networks, and scientific experiment data collection networks.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network device, comprising:
   a memory, configured to store a hash table for accessing a database of network addresses, the hash table comprising multiple buckets, each bucket dimensioned to store entries for up to a maximal permitted number of the network addresses;
   a memory access circuit, configured to receive a network address, to calculate a hash value over at least the network address by applying a hashing scheme selected from among a plurality of hashing schemes, to choose a bucket of the hash table based on the hash value, and to access information in the database pertaining to the network address by accessing the selected bucket; and
   a processor, configured to:
      detect that in accordance with the selected hashing scheme, at least one of the buckets is mapped, or is about to be mapped, to more than the maximal permitted number of the network addresses; and
      replace the selected hashing scheme with an alternative hashing scheme from among the plurality of the hashing schemes, wherein in accordance with the alternative hashing scheme none of the buckets is mapped to more than the maximal permitted number of the network addresses.

2. The network device according to claim 1, wherein the memory access circuit is configured to apply a given hashing scheme from among a plurality of hashing schemes, by:
   calculating a hash function over at least the network address, so as to produce a hash result; and
   deriving the hash value by selecting a partial subset of bits of the hash result, the partial subset defined by the given hashing scheme and including less than all bits of the hash result.

3. The network device according to claim 1, wherein the processor is configured to monitor fill levels of one or more of the buckets, and to replace the selected hashing scheme in response to the fill levels violating a condition defined with respect to the maximal number of the network addresses.

4. The network device according to claim 3, wherein the network device is part of a communication network in a vehicle, and wherein the processor is configured to monitor the fill levels of the buckets in response to an event indicative of a change in assignment of the network addresses in the communication network.

5. The network device according to claim 3, wherein the processor is configured to monitor the fill levels periodically.

6. The network device according to claim 3, wherein the processor is configured to receive from the memory access circuit a notification that one or more of the buckets violates the condition, and to replace the selected hashing scheme in response to the notification.

7. The network device according to claim 1, wherein the processor is configured to replace the selected hashing scheme by:
   backing-up the hash table, which was populated in accordance with the selected hashing scheme, to a backup memory;

re-populating the hash table in accordance with the alternative hashing scheme; and ascertaining that none of the buckets of the re-populated hash table is mapped to more than the maximal permitted number of the network addresses.

8. The network device according to claim 1, wherein the processor is configured to issue a failure notification upon failing to find any hashing scheme for which no bucket is mapped to more than the maximal permitted number of the network addresses.

9. The network device according to claim 1, wherein the network addresses are Medium Access Control (MAC) addresses.

10. A method for database access in a network device, the method comprising:

storing, in a memory, a hash table for accessing a database of network addresses, the hash table comprising multiple buckets, each bucket dimensioned to store entries for up to a maximal permitted number of the network addresses;

in a memory access circuit, receiving a network address, calculating a hash value over at least the network address by applying a hashing scheme selected from among a plurality of hashing schemes, choosing a bucket of the hash table based on the hash value, and accessing information in the database pertaining to the network address by accessing the selected bucket; and using a processor, (i) detecting that in accordance with the selected hashing scheme, at least one of the buckets is mapped, or is about to be mapped, to more than the maximal permitted number of the network addresses, and (ii) replacing the selected hashing scheme with an alternative hashing scheme from among the plurality of the hashing schemes, wherein in accordance with the alternative hashing scheme none of the buckets is mapped to more than the maximal permitted number of the network addresses.

11. The method for database access according to claim 10, wherein applying a given hashing scheme from among a plurality of hashing schemes comprises:

calculating a hash function over at least the network address, so as to produce a hash result; and deriving the hash value by selecting a partial subset of bits of the hash result, the partial subset defined by the given hashing scheme and including less than all bits of the hash result.

12. The method for database access according to claim 10, wherein selecting the hashing scheme comprises monitoring fill levels of one or more of the buckets, and replacing the selected hashing scheme in response to the fill levels violating a condition defined with respect to the maximal number of the network addresses.

13. The method for database access according to claim 12, wherein the network device is part of a communication network in a vehicle, and wherein monitoring the fill levels of the buckets is performed in response to an event indicative of a change in assignment of the network addresses in the communication network.

14. The method for database access according to claim 12, wherein the monitoring the fill levels is performed periodically.

15. The method for database access according to claim 12, wherein selecting the hashing scheme comprises receiving from the memory access circuit a notification that one or more of the buckets violates the condition, and replacing the selected hashing scheme in response to the notification.

16. The method for database access according to claim 10, wherein replacing the selected hashing scheme comprises:

backing-up the hash table, which was populated in accordance with the selected hashing scheme, to a backup memory;

re-populating the hash table in accordance with the alternative hashing scheme; and ascertaining that none of the buckets of the re-populated hash table is mapped to more than the maximal permitted number of the network addresses.

17. The method for database access according to claim 10, further comprising issuing a failure notification upon failing to find any hashing scheme for which no bucket is mapped to more than the maximal permitted number of the network addresses.

18. The method for database access according to claim 10, wherein the network addresses are Medium Access Control (MAC) addresses.

* * * * *